Figure 1:
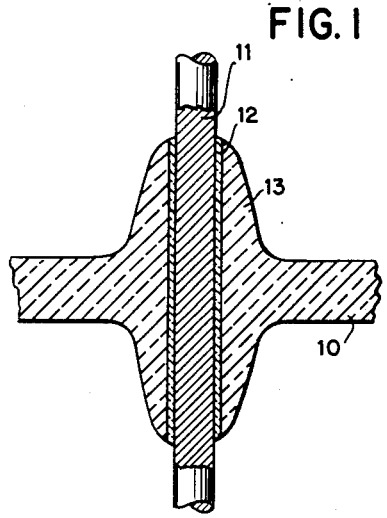

Nov. 4, 1952

W. SPINNLER ET AL 2,617,068

VACUUM-TIGHT GLASS-METAL JOINT FOR VESSELS CONTAINING CESIUM VAPOR

Filed Dec. 13, 1949

2 SHEETS—SHEET 1

Wilhelm Spinnler
Jean Bacher
INVENTORS.

BY c.m. Jully

ATTORNEY

Patented Nov. 4, 1952

2,617,068

UNITED STATES PATENT OFFICE 2,617,068

VACUUM-TIGHT GLASS-METAL JOINT FOR VESSELS CONTAINING CESIUM VAPOR

Wilhelm Spinnler, Bonstetten, and Jean Bacher, Zurich, Switzerland, assignors to FKG Fritz Kesselring Geratebau Aktiengesellschaft, a Swiss company Application December 13, 1949, Serial No. 132,644
In Switzerland December 15, 1948

3 Claims. (Cl. 313—227)

Our invention relates to vacuum-tight glass-metal joints for vessels containing cesium vapor. Various purposes require the use of cesium vapor at relatively high temperatures in glass or metal vessels containing no appreciable quantities of other gases. For example, cesium vapor may be used in electronic rectifier and illuminating tubes or for other electronic purposes. Borosilicate glasses, especially the commercially available heat resistant glass known under the trade name "Pyrex" are known to be also resistant to cesium vapor and suitable for manufacture of such vessels. These "Pyrex" glasses are borosilicate glasses that resist the attack of cesium even at temperatures of over 150° C.

It has been found, however, that in such vessels the glass-metal joints, for instance the necessary electrode lead-ins, are considerably more subject to corrosion than are the glass and metal parts themselves. This is due to the action of the hot cesium vapor on the layer of metallic oxide located in the transitory fusion zone between the glass and the metal, this layer being produced by the fusing process and being necessary for sealing purposes. As a rule, metal parts made of tungsten are fused to borosilicate glass because the coefficients of linear expansion of these two materials approximately coincide. In the fusing process, a yellowish layer of tungsten oxide is formed as an intermediate layer. This oxide, however, offers particularly poor resistance to hot cesium vapor, with the result that fused joints of this type begin to leak after a few hours of service.

It is an object of our invention to provide vessels containing cesium vapor, and particularly cesium-vaporous thermionic discharge vessels, with glass-to-metal fusion joints or seals capable of withstanding deterioration by cesium attack during a useful life period of such considerable length as needed for a commercial and economical application of such vessels.

To this end, and in accordance with the invention, at least that portion of the joint that is in contact with the cesium vapor consists of a fusion of oxidized molybdenum to the cesium-proof glass and the thermal design of the vessel is such as to prevent any continuous heating above 280° C. of those points of fusion that are in contact with the cesium vapor.

For further explanation it should be pointed out that it has been found that molybdenum, when fused to borosilicate glasses, and in particular to the above-mentioned "Pyrex" glass forms an intermediate layer resistant to the action of cesium vapor. Fused "Pyrex" molybdenum joints at temperatures of about 200° C., for instance, are not attacked by cesium vapor even after several thousand hours of service. However, further investigations have shown that at temperatures higher than 280° C. even fused molybdenum-borosilicate-glass joints aret destroyed by cesium vapor. At a temperature of 340° C. such a fused joint of 10 mm. length is destroyed over its entire length after one hour's exposure to the action of cesium vapor, the molybdenum oxide in the vacuum-proof sealing zone being reduced by this action. At a temperature of 320° C., on the other hand, the depth of penetration of the corrosion phenomena along the fused layer amounts to only 1 mm. per 50 hours. The corresponding figure for temperatures of 300° C. is 1 mm. depth of penetration per 160 hours. At lower temperatures the susceptibility of the fused joints to cesium vapor declines rapidly, no appreciable destruction at the point of fusion being observable at 280° C. even after several thousand hours of service.

The design expedients needed to prevent heating of the points of fusion to temperatures exceeding 280° C. may consist, for instance, in facilitating the conduction of heat from the points of fusion, either by giving the metal parts suitably large cross-sectional areas or by providing special cooling devices for the points of fusion; moreover, the arrangement of the points of fusion within the vessel, and the conditions of operation of the latter, can easily be so chosen that the points of fusion do not heat up to temperatures exceeding 280° C.

If the fusing technique employed is correct, such fused joints can be produced with sufficient strength for many purposes in spite of the difference in the coefficients of expansion. Where metal-rod inleads are exposed to particularly high temperatures, it may be of advantage to make the metal rod mainly of a metal whose coefficient of thermal expansion approaches more closely that of the glass used. In this case it is necessary to make at least the cesium-exposed portion of the lead-in rod of molybdenum. However, such a lead-in rod may instead be provided with a molybdenum coat at least at the end that projects into the cesium-vapor-filled chamber, the surface of the molybdenum coat being fused to the glass.

Figure 2:
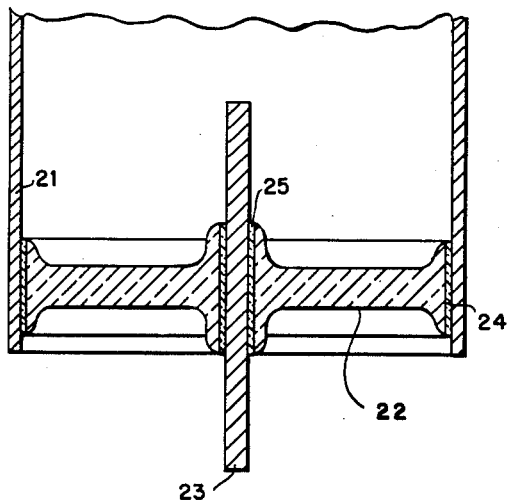
Figure 3:
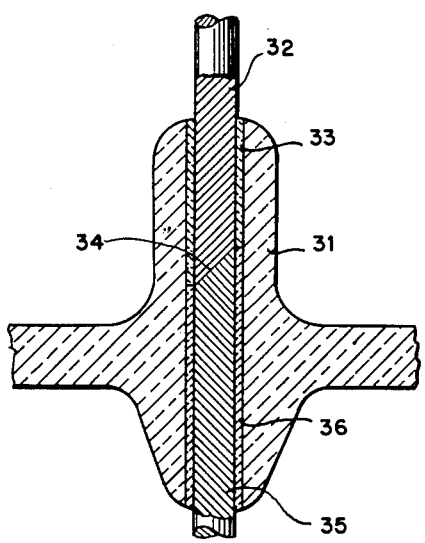
Figure 4:
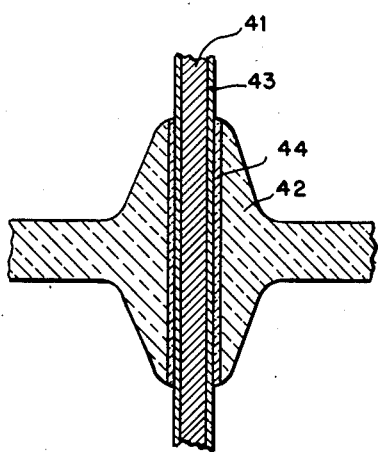
Figure 5:
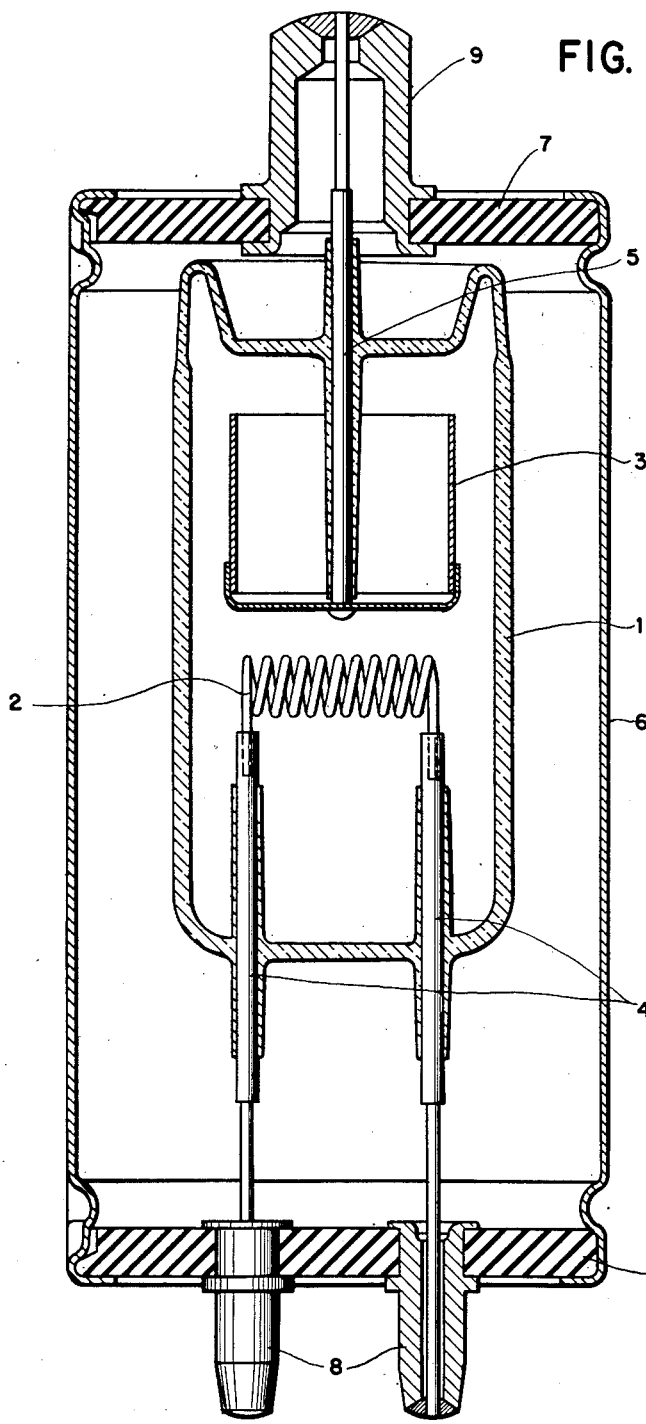

Embodiments of the invention are described hereunder with reference to the annexed drawing in which Fig. 1 shows in cross section an electrode lead-in portion of a cesium-vaporous discharge tube, Fig. 2 shows, also in section, a partial view of a cesium-vaporous discharge tube with a lead-in seal and another fusion joint according to the invention, Figs. 3 and 4 are sectional views of respective modified electrode lead-in portions of such tubes, and Fig. 5 shows in cross section an example of a complete rectifier tube to which the invention is applied.

The cesium vapor filled tube according to Fig. 1 has an envelope portion 10 consisting of the above-mentioned heat-resistant borosilicate glass. This envelope portion has a stud 13 of enlarged thickness at the place where it is traversed by an electrode lead-in rod 11 of molybdenum. The molybdenum rod and the glass body are joined together by an intermediate fusion layer 12 of glass-molybdenum oxide as described in the foregoing.

The tube shown in Fig. 2 has a vessel 21 of modlybdenum containing cesium vapor but no other gases or vapors. Part of the vessel envelope consists of a plate 22 of borosilicate glass and is traversed by an electrode lead-in 23 consisting of a molybdenum rod and sealed to the glass plate by an intermediate molybdenum-oxide-glass fusion layer 25 as described previously. The vacuum-tight molybdenum-glass joint produced by fusion of the glass plate 22 to the vessel 21 is designated by the numeral 24. It is also possible to use some other metal for the wall of the vessel, in which event, however, it would be necessary to provide a junction member of molybdenum at the point 24 on the metal vessel, the junction member being in turn fused to the glass plate 22.

The glass-metal lead-in joint shown in Fig. 3 is part of a vessel containing cesium vapor. The illustrated part 31 of the vessel consists of the above-mentioned borosilicate glass. The space above part 31 is deemed to be the interior of the vessel, and the space below part 31 is the exterior space. A molybdenum in-lead rod 32 is fused to the glass part 31 by an intermediate layer 33. At point 34 a rod 35 of some other metal, such as tungsten, whose coefficient of expansion approaches more closely that of this particular glass, is welded to the molybdenum rod 32, so that the fused joint 36 is mechanically stable even when subjected to extremely high temperature. Since the fused molybdenum-glass joint in contact with the cesium-vapor is resistant to the vapor, the fused tungsten-glass joint 36 cannot be attacked by the cesium.

The cesium-vaporous tube partially shown in Fig. 4 has a lead-in rod consisting of a core 41 of a metal, such as tungsten, whose coefficient of expansion approaches that of the borosilicate glass 42. The core 41 is covered with a coating 43 of molybdenum, which can be produced, for example, by sintering powered molybdenum. This molybdenum coating, when fused to the glass body 42, forms an intermediate layer 44 resistant to the cesium vapor within the vessel.

Fig. 5 shows a rectifier tube whose evacuated envelope 1 consists of a cesium-resistant borosilicate glass and contains a small quantity of metallic cesium. Disposed in the envelope is a helical cathode filament 2 of tungsten, and an anode 3 composed of sheet metal parts of molybdenum. The two inleads 4 of the filament circuit and the anode lead 5, all three consisting of molybdenum, are fused and sealed together with the glass envelope in accordance with the invention. The entire structure is surrounded by a metal cylinder 6 with cover plates 7 of a temperature-resistant insulating material. The filament terminal pins 8 are mounted on one of the insulating plates 7. The anode terminal 9 is cup shaped and mounted on the other insulating plate 7. The coldest spot of the glass envelope reaches a temperature of at least 150° C. when only the filament heating current is switched in. The diameters of the cathode and anode inleads and the radiating surface of the anode are so large as to keep the operating temperature of the fusion seals at 4 and 5 below 280° C. under full anode load.

We claim:

1. A thermionic discharge device comprising, in combination, a sealed envelope containing cesium vapor and having an envelope portion of cesium-resistant borosilicate glass, a vacuum-proof glass-to-metal fusion seal forming part of said portion and being exposed to said cesium vapor, said seal having a lead-in wire of molybdenum and a glass-molybdenum oxide fusion zone joining said borosilicate glass with said wire.

2. With an electronic discharge device having an envelope structure containing cesium vapor, in combination, a vacuum-tight seal forming part of said envelope structure and having a portion exposed to said cesium vapor, said seal portion consisting of a fusion of cesium-resistant borosilicate glass and a superficially oxidized conductor of molybdenum, and said device having a heat dissipating capacity adapted to maintain said seal portion at a steady-state temperature of at most 280° C.

3. With a thermionic discharge device having an envelope containing cesium vapor and having an envelope portion of cesium-resistant glass, in combination, a vacuum-proof glass-metal fusion seal exposed to said cesium vapor and comprising an in-lead of molybdenum having a molybdenum oxide-glass fusion zone joined with said vessel portion, said vessel having at said fusion zone a steady-state operating temperature of at most 280° C.

WILHELM SPINNLER.
JEAN BACHER.

REFERENCES CITED

The following references are of record in the file of this patent:

UNITED STATES PATENTS

| Number | Name | Date |
| --- | --- | --- |
| 1,320,114 | Birdsall | Oct. 28, 1919 |
| 1,531,966 | Mackay | Mar. 31, 1925 |
| 1,728,822 | Charlton | Sept. 17, 1929 |
| 1,922,535 | Erickson | Aug. 15, 1933 |
| 2,060,043 | Cox | Nov. 10, 1936 |
| 2,190,302 | Waldschmidt | Feb. 13, 1940 |
| 2,515,706 | Greiner et al. | July 18, 1950 |

FOREIGN PATENTS

| Number | Country | Date |
| --- | --- | --- |
| 109,325 | Australia | Dec. 6, 1939 |
| 354,620 | Great Britain | Aug. 13, 1931 |